Feb. 20, 1940.   H. NAGEL   2,191,035
VIEW FINDER MOUNT
Filed July 29, 1938   2 Sheets-Sheet 1
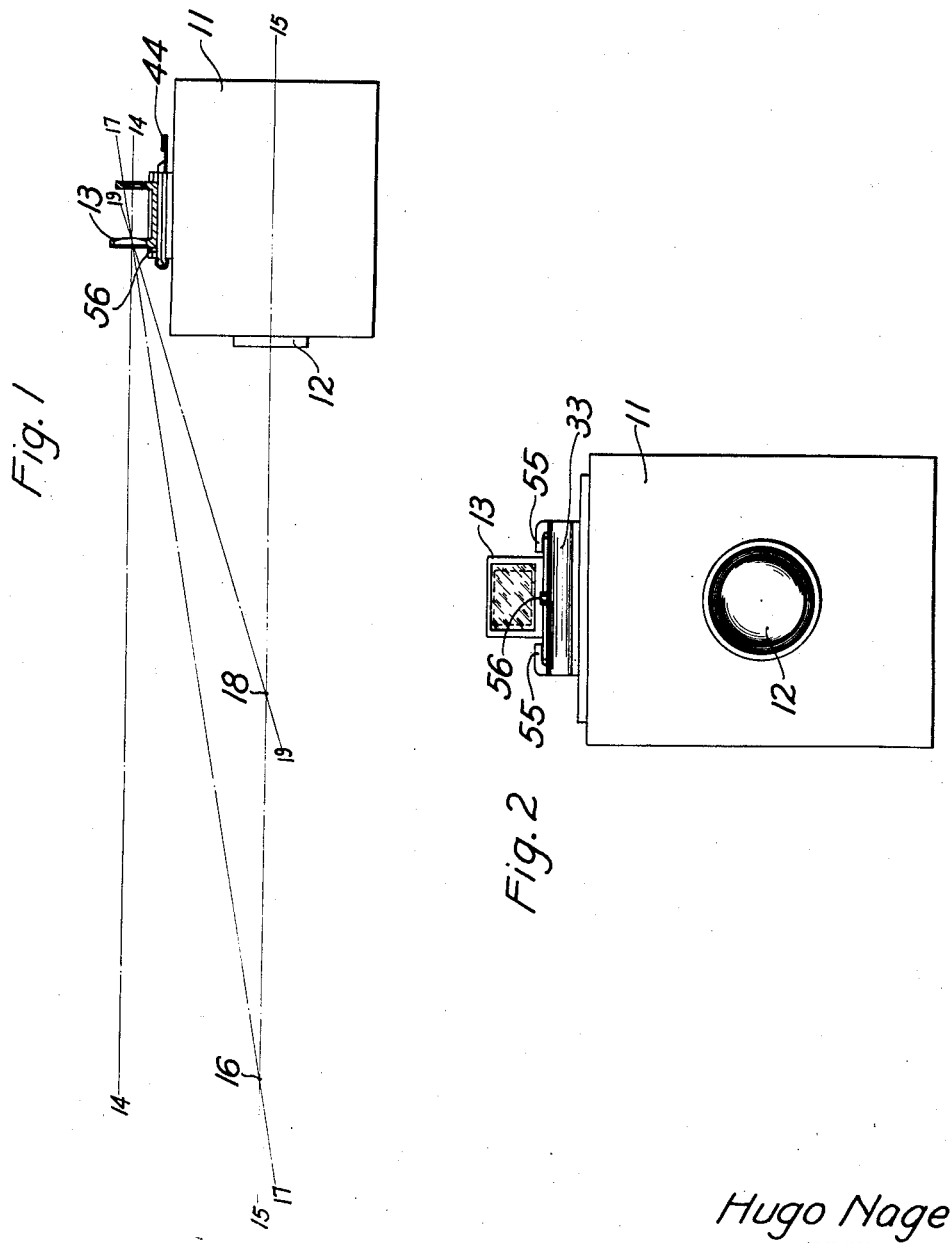
Hugo Nagel
INVENTOR
BY
ATTORNEYS Feb. 20, 1940.　　　　H. NAGEL　　　　2,191,035
VIEW FINDER MOUNT
Filed July 29, 1938　　　2 Sheets-Sheet 2
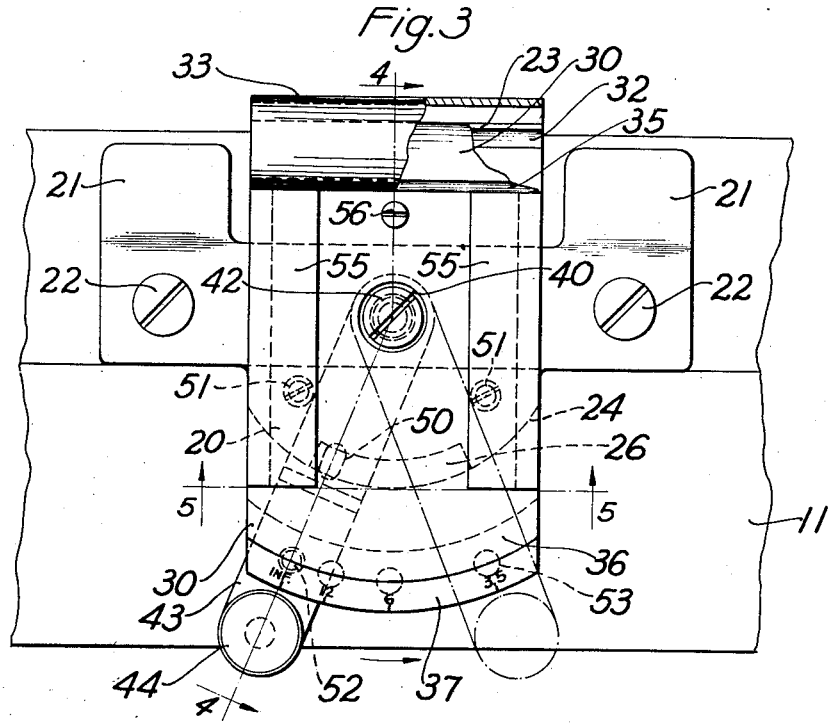
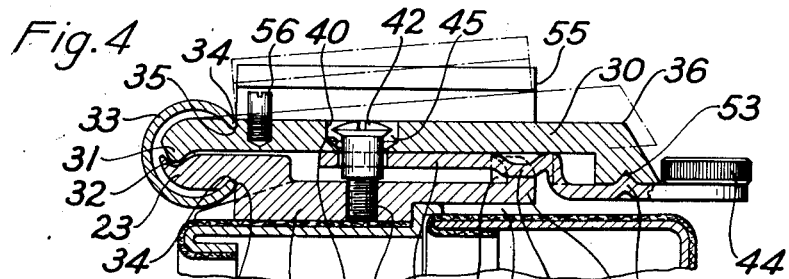
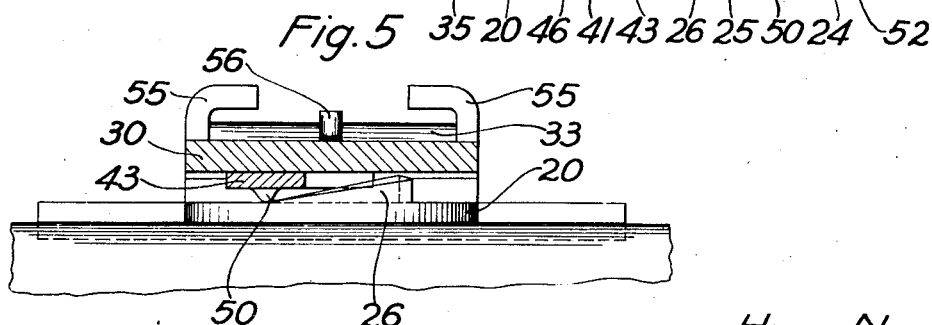
Hugo Nagel
INVENTOR
Newton M. Perrins
BY J. Griffin Little
ATTORNEYS Patented Feb. 20, 1940

2,191,035

UNITED STATES PATENT OFFICE 2,191,035

VIEW FINDER MOUNT

Hugo Nagel, Harrow, England, assignor to Eastman Kodak Company, Rochester, N. Y., a corporation of New Jersey Application July 29, 1938, Serial No. 222,026
In Great Britain May 5, 1938

4 Claims. (Cl. 88—1.5)

The present invention relates to cameras, and more particularly to a direct-vision view finder mount for cameras.

An object of the invention is the provision of a view finder mount which may be adjusted relative to the camera body to compensate for parallax.

Another object of the invention is the provision of a mount which is formed of few parts adapted to be readily and easily assembled or dismounted.

A further object of the invention is the provision of a mount which may be secured as a unit to a camera housing.

Still another object of the invention is the provision of a mount of the class described which is simple in construction, relatively inexpensive to manufacture, and highly effective in use.

To these and other ends, the invention resides in certain improvements and combinations of parts, all as will be hereinafter more fully described, the novel features being pointed out in the claims at the end of the specification.

In the drawings:

Fig. 1 is a side elevation view of a camera of the box type, showing the application thereto of a view finder mount constructed in accordance with the present invention;

Fig. 2 is a front view of the camera and view finder mount illustrated in Fig. 1;

Fig. 3 is a plan view of a portion of a camera illustrated in Fig. 1, but on a larger scale than the latter, showing the arrangement of a view finder mount constructed in accordance with the preferred embodiment of the invention;

Fig. 4 is a vertical sectional view taken substantially on the line 4—4 of Fig. 3, showing the arrangement of the various parts of the mount, and the mechanism by which the view finder supporting portion of the mount may be adjusted relative to the camera body; and Fig. 5 is a vertical sectional view taken substantially on the line 5—5 of Fig. 3, showing the cam means by which the desired adjustment of the view finder is secured.

Similar reference numerals throughout the various views indicate the same parts.

Fig. 1 shows a camera of the box type formed with a body portion 11 in the front end of which a suitable fixed focus lens 12 is mounted. When taking a picture, the object to be photographed is first image in a view finder of any suitable construction and generally indicated by the numeral 13. If the object to be photographed is positioned a sufficient distance in front of the lens 12, the view finder 13 will image the entire field covered by the lens 12 with the axis 14—14 of the finder substantially parallel to the axis 15—15 of the lens.

When, however, the object is moved closer to the lens say to a point 16, the view finder will no longer image the entire field covered by the lens 12 with the finder axis on the line 14—14. This effect is what is known as parallax. In order that the finder may completely image the object at the point 16, the finder must be tilted relative to the body 11 and lens 12 so that the axis of the finder will fall along the axis 17—17 to intersect the axis 15—15 substantially at the point 16. If, on the other hand, the object is moved still closer to the say, to a point 18, the finder must be tilted further so that the axis thereof will lie along the line 19—19. Thus each time the position of the object is changed, within certain well known limits, the degree of tilt of the view finder must be changed, all of which is well known to those in the art.

To secure this result, the present invention provides a view finder mount having a finder supporting portion which may be manually moved a predetermined amount so that the angle of the view finder may be varied to compensate for parallax. This mount comprises, broadly, a pair of parallel hinged plates, one of which is secured to the body portion 11 of the camera while the other plate is adapted to be tilted relative thereto by a movable arm or lever positioned between the plates. This fixed plate is formed with a cam along which the lever is adapted to ride to effect the desired adjustment of the view finder.

In the preferred embodiment, the mount comprises four separable parts, one of which is detachable or permanently fixed to a part of the camera, such for example, as a housing or body portion 11, and which forms a support for the other parts which are movable relative thereto. This support comprises a base plate 20 formed with a lateral portion 21 arranged to be secured to the housing 11 by means of screws 22 or other suitable fastening means. This base plate 20 is formed with an offset hinged portion 23 projecting parallel to and forwardly of the plate, while the rear of the plate has a substantially arcuate portion 24 positioned slightly above the housing 11, as shown at 25, Fig. 4. The projection 24 has formed on the upper face thereof a cam 26 of the shape best shown in Fig. 5, the purpose of which will be later described.

An upper plate 30, which carries the finder 13, overlies the base plate 20 and is adapted to move relative thereto. To this end, the plate 30 has formed on its lower side, adjacent one end thereof, a substantially V-shaped ridge 31 which engages the complementary similarly shaped groove 32 in the portion 23 of the plate 20 to provide a hinged connection for the plates 20 and 30, as is apparent from inspection of Fig. 4. The hinged members are held together by an elongated metal spring member or clip 33 which is C shaped in end elevation and which engages over the ends of the plates 20 and 30, the ends 34 of the clip 33 being engageable in recesses 35 formed in the plates 20 and 30 adjacent the hinged members, as best shown in Fig. 4. The rear or opposite end 36 of the plate 30 is curved concentrically with the projection 24 of the plate 20 and is provided with a distance or focusing scale 37, as best shown in Fig. 3.

A central countersunk hole 40 is drilled through the upper plate 30 and registers with a threaded opening 41 formed in the base plate 20. A headed screw 42 extends through the hole 40 and is threadedly received in the opening 41. This screw serves as a pivot pin for a control arm or lever 43 positioned between the plates 20 and 30, all as clearly shown in Fig. 4. The free end of the lever 43 projects beyond the curved end 36 of the plate 30 and is provided with a milled actuating knob 44 which is secured to the lever 43 in any well-known manner. It is readily seen upon inspection of Fig. 4 that when the screw 41 is in position, a small gap 45 is provided between the screw head and the bottom 46 of the countersunk portion of the hole 40 so as to enable the upper plate 30 to be moved relative to the base plate 20. The head of the screw 42, however, serves to limit the upward movement of the plate 30 due to the bottom 46 of the countersunk portion of the hole 40 engaging the under side of the screw head, as is apparent from an inspection of Fig. 4.

When the lever 43 is moved about the pivot pin 41, a protuberance 50 formed on or secured to the under side of the lever 43 rides along the cam 26 to tilt or adjust the upper plate 30, and hence the view finder 13, about the axis of the hinged members 31 and 32, the angle of tilt being determined by the degree of movement of the lever 43. The proper adjustment of the lever 43 is determined by bringing the latter into register with the desired reading on the scale 37, thus insuring that the finder 13 has been tilted sufficiently to compensate for parallax.

The angular movement of the lever 43 is limited by a pair of pins 51 secured to and depending from the upper plate 30. In order to eliminate any possibility of the lever 43 being accidentally moved after it has been set at the desired distance, the lever is preferably provided with a small protuberance 52 which is arranged to selectively engage a series of depressions 53 formed on the under side of the plate 30, and in alignment with the various designations on the scale 37, as shown in Figs. 3 and 4.

The above-described mount is primarily intended for a detachable view finder. To this end, the upper plate 30 is provided with a pair of lateral channels 55 into which the finder 13 may be slid, as is apparent from inspection of Fig. 5. A pin 56 on the top of the plate 30 positions the finder 13 thereon. It is contemplated, however, that the finder may be permanently attached to the plate 30, in which case the entire mount, with the finder thereon, may be either permanently or detachably secured as a unit to the camera housing. While the mount has been shown in connection with a box camera, this is by way of illustration only, and such a mount is equally adapted for use with cameras of the folding type. Although it is preferred to provide the finder mount on the camera housing, either top or side, it will be readily appreciated that it may be arranged on a relatively fixed part of the camera front or the camera bed in the case of a folding camera.

The above-described view finder mount provides a simple means by which the finder may be readily, easily, and accurately adjusted to compensate for parallax. The various parts of the mount may be readily assembled to form a unit which may be dismounted merely by removing the screw 41, and sliding the C shaped spring 33 along the plates 20 and 30, whereupon the plates 20 and 30 and the lever 43 may be separated from the base plate 20.

While one embodiment of the invention has been disclosed, it is to be understood that the inventive idea may be carried out in a number of ways. This application is, therefore, not to be limited to the precise details described, but is intended to cover all variations and modifications thereof falling within the spirit of the invention or the scope of the appended claims.

I claim:

1. The combination with a camera having a body portion, of a mount for a view finder comprising a base plate detachably secured to said portion, an upper plate overlying said base plate and pivotally connected thereto, means on said upper plate for detachably securing said finder thereto, a lever pivotally mounted on said base plate and positioned between said plates and engaging said upper plate, and means on said base plate for lifting said lever when the latter is moved about said pivot to adjust said upper plate and said finder relative to said body portion.

2. The combination with a camera having a body portion, of a mount for a view finder comprising a base plate detachably secured to said portion, an upper plate overlying said base plate and pivotally connected thereto, means on said upper plate for detachably securing said finder thereto, a stud secured to said base plate and extending through said upper plate, a lever pivotally mounted on said stud and engaging said upper plate, cooperating cam members on said base plate and said lever whereby the lever and upper plate are adjusted relative to the base plate when said lever is moved about its pivot to adjust said finder relative to said portion and means for maintaining said lever in adjusted position.

3. The combination with a camera having a body portion, of a mount for a view finder comprising a base plate detachably secured to said portion, an upper plate overlying said base plate and pivotally connected thereto, means on said upper plate for detachably securing said finder thereto, a stud secured to said base plate, a lever pivotally mounted on said stud and engaging said upper plate, a cam on said base plate, an offset portion formed on said lever and arranged to engage said cam when said lever is moved about its pivot to tilt said upper plate on said base plate to adjust said finder relative to said portion, cooperating means on said upper plate and said arm to maintain the latter in adjusted position, and an actuating knob formed on said lever.

4. The combination with a camera having a body portion, of a mount for a view finder comprising, in combination, a base plate secured to said portion, an upper plate overlying said base plate, cooperating hinge portions formed at one end of base and upper plates, a spring clip engaging said plates to hold said hinge portions in engaging relation, means on said upper plate for detachably securing and positioning said view finder thereon, a stud on said base plate, a lever positioned between said plates and pivoted at one end on said stud and having the free end projecting beyond said upper plate, an actuating knob on the free end of said lever, and inclined cam on the upper surface of said base plate, a portion of said lever engaging said cam and arranged to move therealong when said lever is moved about said pivot to engage and tilt said upper plate relative to said base plate to adjust said finder relative to said portion, and a protuberance on said lever arranged to engage a registering notch in said upper plate to maintain said lever and upper plate in adjusted position.

HUGO NAGEL.